(12) United States Patent
Yamayose

(10) Patent No.: US 9,126,869 B1
(45) Date of Patent: *Sep. 8, 2015

(54) METHOD FOR MANUFACTURING ALUMINUM-TITANATE-BASED CERAMIC HONEYCOMB STRUCTURE

(71) Applicant: Ibiden Co., Ltd., Ogaki-shi (JP)

(72) Inventor: Kazunori Yamayose, Stuttgart (DE)

(73) Assignee: IBIDEN CO., LTD., Ogaki-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/873,763

(22) Filed: Apr. 30, 2013

Related U.S. Application Data

(60) Provisional application No. 61/787,970, filed on Mar. 15, 2013.

(51) Int. Cl.
B01D 39/20 (2006.01)
C04B 35/64 (2006.01)
C04B 38/00 (2006.01)

(52) U.S. Cl.
CPC .................. C04B 38/0006 (2013.01)

(58) Field of Classification Search
CPC .................................. C04B 38/0006
USPC .............. 264/630, 631, 632, 653, 176.1, 634, 264/40.6
See application file for complete search history.

(56) References Cited

U.S. PATENT DOCUMENTS 5,256,347 A * 10/1993 Miyahara ..................... 264/40.6
6,325,693 B1 * 12/2001 Rudell et al. ................ 446/81
6,611,628 B1 * 8/2003 Sekiguchi et al. ........... 382/243
6,840,976 B2 * 1/2005 Vance et al. .................. 55/523
7,253,136 B2 * 8/2007 Mauldin et al. .............. 502/327
7,422,719 B2 * 9/2008 Chan et al. ................... 264/630
7,976,769 B2 * 7/2011 Fletcher et al. .............. 264/630
7,977,266 B2 * 7/2011 Tennent et al. .............. 501/134
8,268,401 B2 * 9/2012 Tokumaru .................... 427/356

(Continued)

FOREIGN PATENT DOCUMENTS

JP          04-031372           2/1992

OTHER PUBLICATIONS

U.S. Appl. No. 13/887,638, filed May 6, 2013, Yamayose.

(Continued)

*Primary Examiner* — Nahida Sultana
(74) *Attorney, Agent, or Firm* — Oblon, McClelland Maier & Neustadt, L.L.P.

(57) ABSTRACT

A method for manufacturing a ceramic honeycomb structure includes kneading titania particles, alumina particles and binder ingredient such that raw material paste including the titania particles, alumina particles and binder ingredient is prepared, forming a body made of the raw material paste and having a honeycomb structure such that the body has the honeycomb structure having multiple through-holes extending in the longitudinal direction of the body and multiple partition portions formed between the through-holes, drying the body made of the raw material paste and having the honeycomb structure such that the body maintains temperature difference of 20° C. or lower between surface temperature at an outer surface of the body and temperature at a central portion of the body and a dried body having the honeycomb structure is formed, and sintering the dried body having the honeycomb structure such that a ceramic body having the honeycomb structure is formed.

11 Claims, 8 Drawing Sheets

(56) References Cited

U.S. PATENT DOCUMENTS

| | | | |
|---|---|---|---|
| 8,584,375 B2 * | 11/2013 | Horiba et al. | 34/475 |
| 2002/0022109 A1 * | 2/2002 | Ichikawa et al. | 428/116 |
| 2002/0109269 A1 * | 8/2002 | Miura et al. | 264/432 |
| 2004/0052941 A1 * | 3/2004 | Ichikawa et al. | 427/226 |
| 2006/0042116 A1 * | 3/2006 | Terazawa et al. | 34/259 |
| 2006/0192324 A1 * | 8/2006 | Kaneda et al. | 264/630 |
| 2007/0252310 A1 * | 11/2007 | Brockway et al. | 264/432 |
| 2008/0023886 A1 * | 1/2008 | Adrian et al. | 264/489 |
| 2008/0106009 A1 * | 5/2008 | Naruse et al. | 264/630 |
| 2008/0176028 A1 * | 7/2008 | Ohno et al. | 428/116 |
| 2009/0200712 A1 * | 8/2009 | Hayashi et al. | 264/630 |

OTHER PUBLICATIONS

U.S. Appl. No. 13/872,483, filed Apr. 29, 2013, Yamayose.
U.S. Appl. No. 13/873,576, filed Apr. 30, 2013, Yamayose.
U.S. Appl. No. 13/873,379, filed Apr. 30, 2013, Yamayose.
U.S. Appl. No. 13/887,688, filed May 6, 2013, Yamayose.
U.S. Appl. No. 13/873,624, filed Apr. 30, 2013, Yamayose.
U.S. Appl. No. 13/873,933, filed Apr. 30, 2013, Yamayose.

* cited by examiner

Cross-sectional view at line (A-A)

METHOD FOR MANUFACTURING ALUMINUM-TITANATE-BASED CERAMIC HONEYCOMB STRUCTURE

CROSS-REFERENCE TO RELATED APPLICATIONS

The present application is based upon and claims the benefit of priority from U.S. Application No. 61/787,970, filed Mar. 15, 2013, the entire contents of which are incorporated herein by reference.

BACKGROUND OF THE INVENTION

1. Field of the Invention

The present invention relates to a method for manufacturing an aluminum-titanate-based ceramic honeycomb structural body. More specifically, the present invention relates to a method for drying a body formed by shaping raw material paste.

2. Description of Background Art

Japanese Laid-Open Patent Publication No. H04-031372 describes a method for manufacturing a sintered ceramic honeycomb structural body, where a raw material composition made by combining ceramic powder, a binder and water is shaped into a honeycomb structure having multiple cells, and the body is dried and sintered. In such a drying step, the humidity of a drying atmosphere is set at 70~99%. The entire contents of this publication are incorporated herein by reference.

SUMMARY OF THE INVENTION

According to one aspect of the present invention, a method for manufacturing a ceramic honeycomb structure includes kneading titania particles, alumina particles and a binder ingredient such that a raw material paste including the titania particles, the alumina particles and the binder ingredient is prepared, forming a body made of the raw material paste and having a honeycomb structure such that the body has the honeycomb structure having multiple through-holes extending in the longitudinal direction of the body and multiple partitions formed between the through-holes, drying the body made of the raw material paste and having the honeycomb structure such that the body maintains a temperature difference of 20° C. or lower between a surface temperature at an outer surface of the body and a temperature at a central portion of the body and a dried body having the honeycomb structure is formed, and sintering the dried body having the honeycomb structure such that a ceramic body having the honeycomb structure is formed.

Another aspect of the present invention is a ceramic honeycomb structural body produced by a method for manufacturing a ceramic honeycomb structure including kneading titania particles, alumina particles and a binder ingredient such that a raw material paste including the titania particles, the alumina particles and the binder ingredient is prepared, forming a body made of the raw material paste and having a honeycomb structure such that the body has the honeycomb structure having multiple through-holes extending in the longitudinal direction of the body and multiple partitions formed between the through-holes, drying the body made of the raw material paste and having the honeycomb structure such that the body maintains a temperature difference of 20° C. or lower between a surface temperature at an outer surface of the body and a temperature at a central portion of the body and a dried body having the honeycomb structure is formed, and sintering the dried body having the honeycomb structure such that a ceramic body having the honeycomb structure is formed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
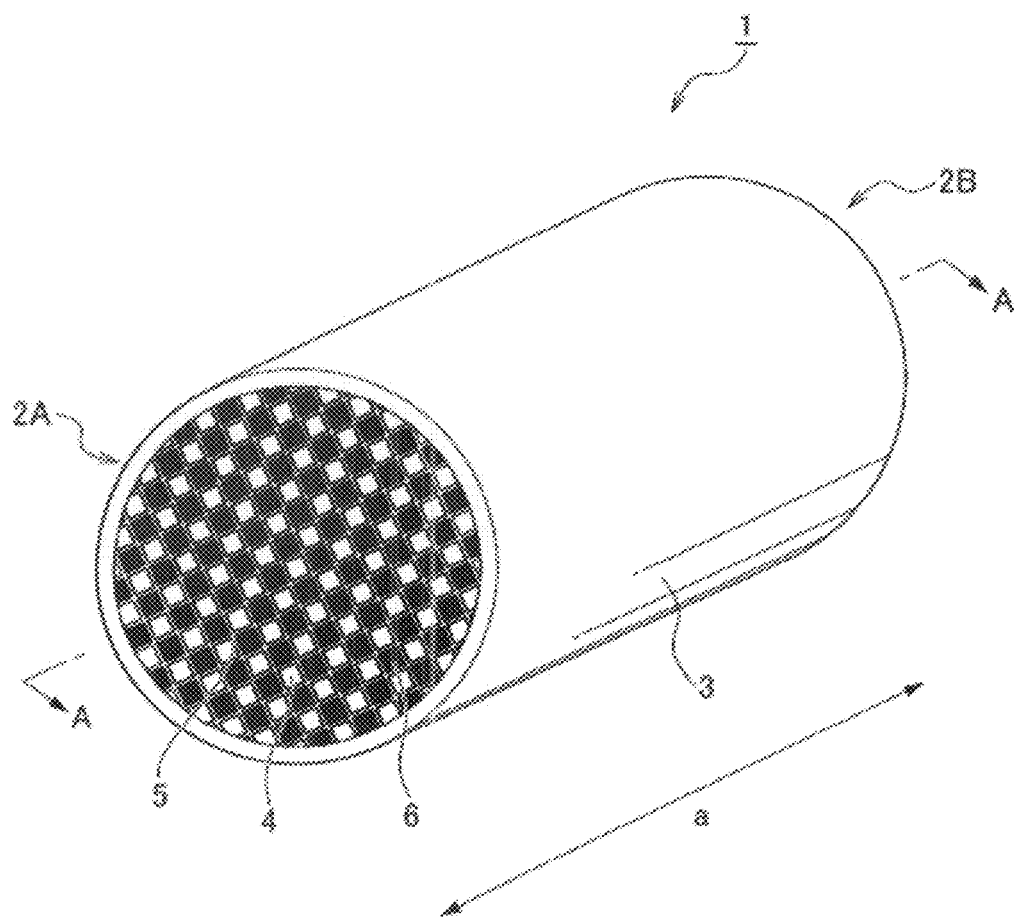
FIG. 1 is a perspective view schematically showing an example of a ceramic honeycomb structural body obtained by a manufacturing method according to an embodiment of the present invention.

The embodiments will now be described with reference to the accompanying drawings, wherein like reference numerals designate corresponding or identical elements throughout the various drawings.

FIG. 1 is a perspective view schematically showing an example of a ceramic honeycomb structural body obtained by a manufacturing method according to an embodiment of the present invention.

As shown in FIG. 1, a ceramic honeycomb structure according to an embodiment of the present invention is made of aluminum-titanate-based ceramic body 1 (aluminum-titanate-based sintered body), for example. Ceramic body 1 has two open end surfaces (2A, 2B) and side surface 3. Also, ceramic body 1 has multiple cells made of through-holes 4 and partitions 5 which section off through-holes 4. Through-holes 4 extend from end surface (2A) to end surface (2B) along a longitudinal direction of ceramic body 1 (direction along arrow (a) in FIG. 1), and through-holes 4 are sectioned off by partitions 5. In addition, either end of a through-hole 4 in a longitudinal direction (a) is sealed by sealant 6, while the other end is left open. Thus, through-hole 4 is sealed by sealant 6 only at either end. As shown in FIG. 1, end surfaces (2A, 2B) of ceramic body 1 are in a checkered pattern where predetermined portions are alternately sealed. However, end surfaces (2A, 2B) of ceramic body 1 are not limited to such a pattern and may be in any other sealing pattern. The sealant is not limited to any specific type, and a raw material paste made of titania particles and alumina particles or other ceramics may also be used.

The shape of ceramic body 1 may also be an elliptic cylinder, a rectangular prism or a polygonal prism instead of a circular cylinder as shown in FIG. 1.

Figure 2:
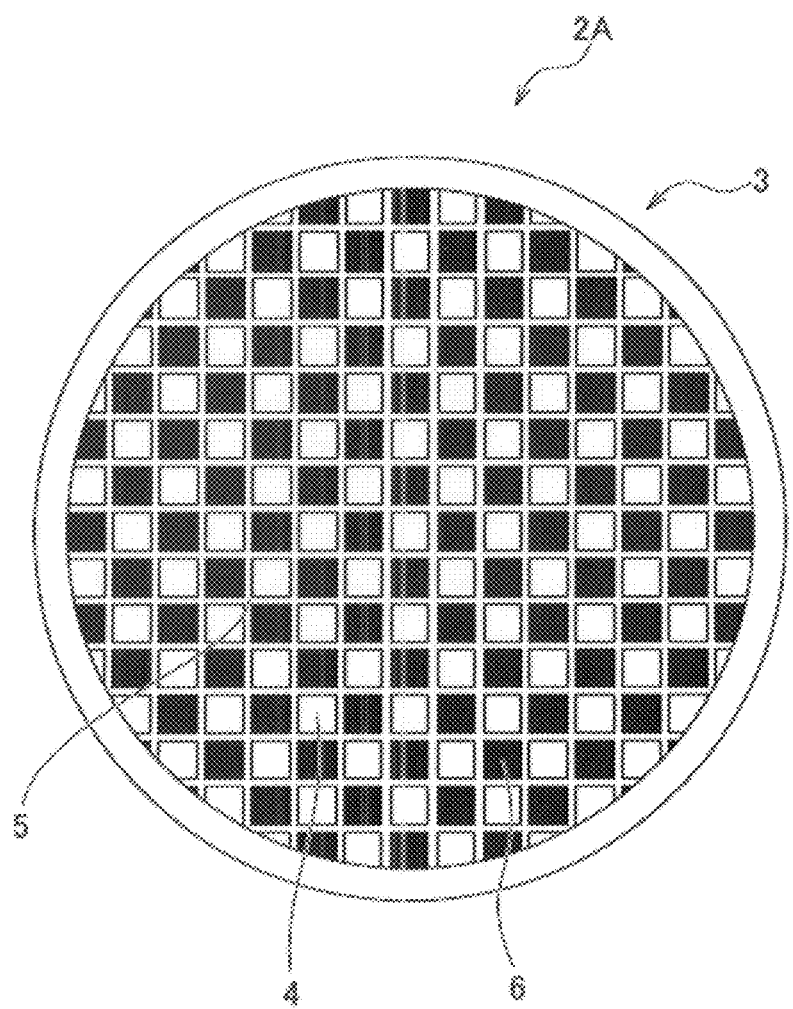
FIG. 2 is a view showing an end surface of the ceramic honeycomb structural body shown in FIG. 1.

FIG. 2 is a view showing an end surface of ceramic honeycomb structural body 1 shown in FIG. 1.

Through-holes 4 are sectioned off by partitions 5 at end surface (2A) of ceramic body 1 as shown in FIG. 2. Also, some end portions of through-holes 4 are sealed by sealant 6 while others are not sealed by sealant 6 and remain open as shown in FIG. 2. Namely, through-hole 4 is sealed by sealant 6 only at either end. Every alternate predetermined portion at end surface (2A) of ceramic body 1 is sealed so as to form a checkered pattern.

Figure 3:
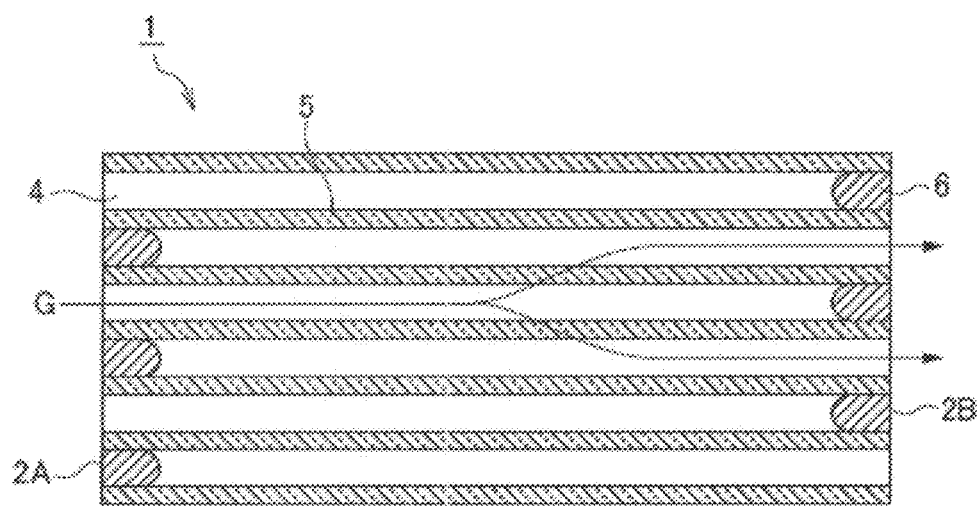
FIG. 3 is a cross-sectional view at line (A-A) of the ceramic honeycomb structural body shown in FIG. 1.

FIG. 3 is a cross-sectional view at line (A-A) of the ceramic honeycomb structural body shown in FIG. 1.

As shown in FIG. 3, one end surface (2A) is positioned on the inflow side, and exhaust gas (G) (exhaust gas from a diesel engine, for example) flows into open through-holes 4, passes through partitions 5 which section off through-holes 4, and flows out from other through-holes 4 that are open at the other end surface (2B) on the outflow side. Therefore, in ceramic honeycomb structural body 1 according to an embodiment of the present invention, partitions 5 can function as a filter to capture particulate matter (PM) or the like, for example, as a diesel particulate filter (DPF).

Next, a method for manufacturing a ceramic honeycomb structure according to an embodiment of the present invention is described in detail.

Figure 4:
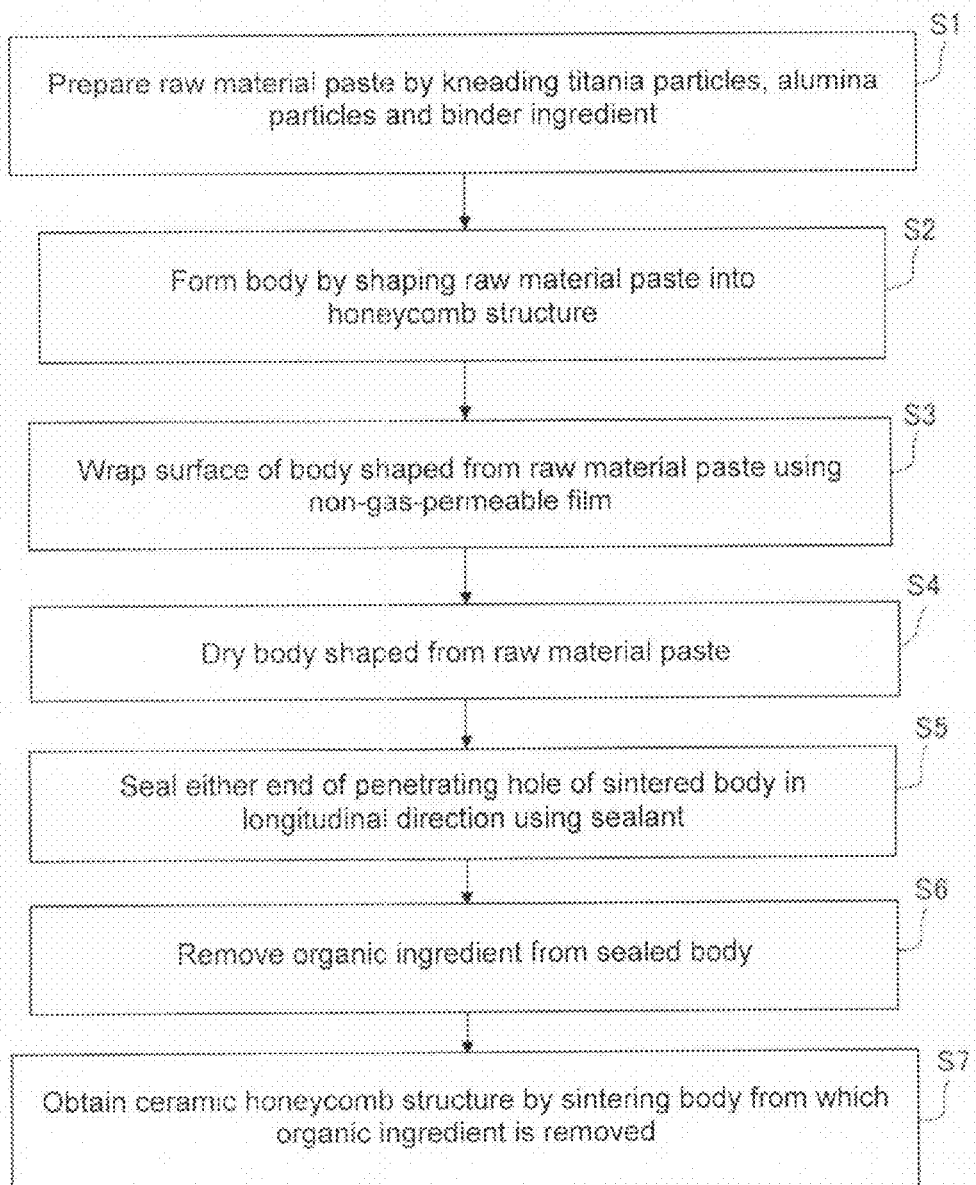
FIG. 4 is a flowchart showing an example of the manufacturing method according to an embodiment of the present invention.

FIG. 4 is a flowchart showing an example of the method for manufacturing a honeycomb structure according to an embodiment of the present invention.

An example of the method for manufacturing a ceramic honeycomb structure as shown in FIG. 4 includes the following: preparation step (S1) for preparing raw material paste by kneading titania particles, alumina particles and a binder ingredient; forming step (S2) to form a body by shaping the raw material paste into a honeycomb structure; wrapping step (S3) for wrapping the surface of the body shaped from the raw material paste using non-gas permeating film; drying step (S4) for drying the body while maintaining the temperature difference within a predetermined range between the surface temperature of the body and the temperature inside through-holes; sealing step (S5) for sealing either end in a longitudinal direction of a through-hole of the dried body using a sealant; degreasing step (S6) for removing organic ingredients from the sealed body; and sintering step (S7) to obtain a ceramic honeycomb structure by sintering the body from which organic ingredients have been removed.

However, it is an option to skip wrapping step (S3), sealing step (S5) and degreasing step (S6) for manufacturing a ceramic honeycomb structure. Namely, in the method for manufacturing a ceramic honeycomb structure, it is an option to conduct preparation step (S1) for preparing raw material paste by kneading titania particles, alumina particles and a binder ingredient, forming step (S2) to form a body by shaping the raw material paste into a honeycomb structure, and drying step (S4) for drying the body while maintaining the temperature difference within a predetermined range between the surface temperature of the body shaped from the raw material paste and the temperature inside through-holes, and then directly after those steps, to conduct sintering step (S7) to obtain a ceramic honeycomb structure by sintering the body without containing organic ingredients.

Sealing step (S5) may be conducted either after forming step (S2) or after sintering step (S7).

In the following, each step is described.

Preparation of Raw Material Paste (S1)

In a preparation step, raw material paste is prepared by kneading titania particles, alumina particles and a binder ingredient. Also, raw material paste may be prepared by kneading titania particles, alumina particles, mullite particles and a binder ingredient.

In the present application, titania particles indicate those containing only titania, and alumina particles indicate those containing only alumina. Mullite particles mean particles formed with alumina and silicon dioxide. Here, titania particles, alumina particles and mullite particles may contain impurities. As for impurities, for example, silicon (Si), aluminum (Al), iron (Fe), calcium (Ca), magnesium (Mg), potassium (K), sodium (Na) and the like are listed.

A method for kneading titania particles, alumina particles and a binder ingredient is not limited specifically, and a mixer, a kneader, a media mixing mill (attritor), a pressure kneader (muller) or the like may be used for kneading.

Titania particles and alumina particles may be used as is, or may be slurried using a dispersing medium such as water. Alternatively, later-described mixed particles of titania particles and alumina particles may be used. Yet alternatively, mullite particles may be added to titania particles and alumina particles.

As for titania particles and alumina particles used in the preparation step, it is an option for titania particles and alumina particles in a precursor to be combined at an amount-of-substance ratio of titania to alumina in a range of 40:60~60:40, for example. It is also preferable to combine titania particles and alumina particles in a precursor at an amount-of-substance ratio of titania to alumina in a range of 45:55~55:45, for example. An amount-of-substance ratio here means a ratio of the amount of substance of titania to the amount of substance of alumina, not an amount-of-substance ratio of titania particles to alumina particles. Therefore, when mullite particles or the like are used when forming a precursor, an amount-of-substance ratio of titania to alumina is obtained based on the sum of alumina (amount of substance of alumina) derived from alumina particles and alumina derived from mullite particles. Accordingly, when mullite particles are used in the preparation step, it is preferred to combine mullite particles with titania particles and alumina particles in an amount-of-substance ratio of titania to alumina that is within the above range.

When titania particles and alumina particles are combined in a preparation step or in a later-described preconditioning treatment step, their weight ratio is, for example, in a range of 35:65~55:45, more preferably, 40:60~50:50. The amount of unreacted titania or alumina remaining after sintering is reduced if combined within such a ratio.

Particle diameters of titania particles and alumina particles are not limited specifically. For example, when particle diameters of titania particles and alumina particles are compared, it is an option to use any of the following: the diameter of titania particles is greater than that of alumina particles; the diameter of titania particles is smaller than that of alumina particles; or the diameter of titania particles is substantially the same as that of alumina particles.

When alumina particles and titania particles having a particle diameter greater than that of alumina particles are used, it may be referred to as a "first mode" in the following. In addition, when alumina particles and titania particles having a particle diameter smaller than that of alumina particles are used, it is referred to as a "second mode" and described below. Moreover, when alumina particles and titania particles having a particle diameter substantially the same as that of alumina particles are used, it is referred to as a "third mode" and described below.

As for the particle diameter of titania particles in the first mode, the mean volume particle diameter is 5 μm~20 μm, for example. Also, particles with a mean volume particle diameter of 8 μm~18 μm or the like may be used. Here, it is an option to use primary particles of titania particles or secondary particles that are aggregate primary particles, or to use a combination thereof.

In the present application, mean volume particle diameters are measured using a laser diffraction particle size distribution analyzer (Beckman Coulter Inc.).

As for the particle diameter of alumina particles in the first mode, the mean volume particle diameter is 2 μm~5 μm, for example.

In the present application, the type of alumina particles is not limited specifically. For example, α-alumina particles, γ-alumina particles, a combination of α-alumina particles and γ-alumina particles, or the like may be used. In addition, alumina particles may be primary particles, secondary particles that are aggregate primary particles, or a combination thereof.

In the first mode, the ratio of particle diameters of titania particles to alumina particles is not limited specifically, and it may be in a range of 10:1~10:3, for example.

A second mode is described in the following, using alumina particles and titania particles having a smaller particle diameter than that of alumina particles.

As for the particle diameter of titania particles in the second mode, the mean volume particle diameter is 0.1 μm~0.8 μm or 0.2 μm~0.5 μm, for example.

As for the particle diameter of alumina particles in the second mode, the mean volume particle diameter is 2 μm~5 μm, for example.

In the second mode, the ratio of particle diameters of titania particles to alumina particles is not limited specifically, and it may be in a range of 1:4~1:10, for example.

Furthermore, a third mode is described, using titania particles and alumina particles having substantially the same particle diameters as each other.

As for the particle diameter of titania particles in the third mode, the mean volume particle diameter is 1 μm~5 μm or 1 μm~3 μm, for example.

As for the particle diameter of alumina particles in the third mode, the mean volume particle diameter is 2 μm~5 μm, for example.

In the third mode, the ratio of particle diameters of titania particles to alumina particles is not limited specifically, and it may be in a range of 1.0:0.3~1:4, for example.

As for the particle diameter of mullite particles to be used in addition to titania particles and alumina particles if needed, the mean volume particle diameter is 0.1 μm~45 μm, for example. Alternatively, a mean volume particle diameter of 0.1 μm~20 μm, 0.5 μm~10 μm and so forth, for example, may also be used. When a body is sintered and aluminum titanate is produced, unreacted aluminum and silicon contained in mullite particles are thought to melt and work as a binder which fills spaces in aluminum titanate.

The mullite particles may be primary particles, secondary particles that are aggregate primary particles, or a combination thereof.

The powder of titania particles (titania powder) containing titania particles used for forming a precursor in the present embodiment may include impurities such as silicon (Si), aluminum (Al), iron (Fe), calcium (Ca), magnesium (Mg), potassium (K) and sodium (Na). In the present application, "titania powder" means bulk (material, raw material) of titania particles to be used in a method for manufacturing a ceramic honeycomb structure. Here, impurities in titania powder may be such that are contained inevitably during a process for manufacturing titania, or may be such that are mixed into titania powder separately. In addition to impurities that make solid solutions with titania particles, other impurities that are present outside titania particles of titania powder may also be included.

It is thought that those impurities contribute to suppressing the decomposition of aluminum titanate, which is made from titania particles and alumina particles, into titania and alumina in a high temperature range, or to improving the mechanical strength of aluminum titanate.

The amount of impurities is adjusted by controlling the amount of impurities contained in raw titania material such as $Ti(OH)_4$ (titania powder) or the like or by cleansing synthesized titania by using acids, alkalis or the like.

The amount of iron in titania powder is preferred to be at a weight ratio of 200 ppm~1000 ppm in the titania powder in terms of $Fe_2O_3$. When the amount of iron in titania powder is in the above range, it is thought that aluminum titanate formed when part of $Al^{3+}$ is displaced by $Fe^{2+}$ is suppressed from decomposing to titania and alumina in a high temperature range.

The amount of silicon contained in titania powder is preferred to be 0.1 wt. %~1.0 wt. % of the titania powder in terms of $SiO_2$. When the amount of silicon in titania powder is in the above range, it is thought that aluminum titanate formed when part of $Al^{3+}$ is displaced by $Si^{4+}$ is suppressed from decomposing to titania and alumina in a high temperature range.

Magnesium is preferred not to be contained in titania powder. When contained, the amount of magnesium in titania powder is preferred to be at a weight ratio of 500 ppm or lower in the titania powder in terms of MgO. Since MgO tends to absorb water, if MgO exists at particle boundaries among aluminum titanate particles, it is thought that MgO may cause cracking due to expansion from moisture absorption. Thus, the amount of magnesium in titania powder is preferred to be within the above range. Alternatively, it is preferred that no magnesium, or substantially no magnesium (at or below the detection limit), be contained in titania powder.

The amount of potassium in titania powder is preferred to be at a weight ratio of 100 ppm~600 ppm in the titania powder in terms of $K_2O$. In addition, the amount of sodium in titania powder is preferred to be at a weight ratio of 200 ppm~1000 ppm in the titania powder in terms of $Na_2O$. It is thought that $K_2O$ and $Na_2O$ work as sintering aids for sinter-bonding aluminum titanate particles to each other so as to suppress cracking at particle boundaries among aluminum titanate particles. Thus, the amounts of potassium and sodium in titania powder are preferred to be in the above ranges.

Specifically, mixed particles of titania particles and alumina particles, or mixed particles of titania particles, alumina particles and mullite particles are formed by the following preconditioning treatment step.

Preconditioning Treatment

Titania particles and alumina particles are brought into contact and adhered to each other to form a precursor (a particle contact body of titania particles and alumina particles) in the preconditioning treatment step. Accordingly, a precursor is obtained where titania particles and alumina particles are homogenized and in contact with each other.

In the preconditioning treatment step, a precursor may also be formed by further adding a sintering aid to bring it into contact with titania particles and alumina particles (particle contact body of titania particles, alumina particles and a sintering aid). As for sintering aids, mullite, zircornia, alkali feldspar, strontium feldspar and the like are listed.

In the present application, "homogenized" indicates that titania particles and alumina particles are present evenly based on the amounts of substance (at a molar ratio). It is more preferred that an amount-of-substance ratio of titania to alumina in a precursor be in a range of 40:60~60:40, for example. As described above, an amount-of-substance ratio here means a ratio of the amount of substance of titania to the amount of substance of alumina, not an amount-of-substance ratio of titania particles to alumina particles. Therefore, when mullite particles or the like are used when forming a precursor, an amount-of-substance ratio of titania to alumina is obtained based on the sum (total amount of substance of alumina) of alumina derived from alumina particles and alumina derived from mullite particles.

To bring titania particles and alumina particles into contact with each other in the above first mode, it is an option to conduct any of the following, for example: a method in which a mixture containing titania particles and alumina particles is spray-dried; a method in which titania particles and alumina particles are granulated through a rolling motion; a method in which an aqueous dispersion of alumina particles is formed by dispersing alumina particles in a dispersion medium such as water, and then titania particles are immersed in the aqueous dispersion of alumina particles; or a method in which a mixture of titania particles and alumina particles is slurried and then dried while being mixed.

As for a method in which a mixture containing titania particles and alumina particles is spray-dried, for example, a mixture containing titania particles and alumina particles is slurried and spray-dried so that titania particles and alumina particles are homogenized.

In addition, as for another method of spray-drying, for example, a binder ingredient to be used in a later-described preparation step is further added to the mixture containing titania particles and alumina particles at 5%~10% by mass based on the entire mass of titania particles, and then the mixture is spray-dried.

As for a method in which titania particles and alumina particles are granulated through a rolling motion, for example, titania particles, alumina particles and water are placed in an oscillating granulator and then put into a rolling motion to prepare a precursor; titania particles and water are placed in an oscillating granulator and put into a rolling motion, then alumina particles are added to the oscillating granulator and put into a rolling motion so that a precursor is prepared; and so forth. In such cases, a ratio of 5%~10% by mass of water based on the entire mass of titania particles is used. Moreover, it is an option to use a binder ingredient (such as methylcellulose) along with water. A ratio of 5%~10% by mass of a binder ingredient based on the entire mass of titania particles may be used.

As for a method in which titania particles are immersed in an aqueous dispersion of alumina particles, for example, alumina particles are dispersed in a dispersion medium such as water to form an aqueous dispersion of alumina particles, titania particles are immersed in the aqueous dispersion of alumina particles, and then a precursor, in which titania particles and alumina particles are homogenized and in contact with each other, is lifted from the aqueous dispersion of alumina particles.

As for a method in which a mixture containing titania particles and alumina particles is slurried and then dried while being mixed, for example, titania particles and alumina particles are slurried using a volatile solvent or the like to form a homogeneous mixture, which is then dried while being mixed.

When using alumina particles and titania particles having a greater diameter than that of alumina particles in the first mode, conducting a preconditioning treatment step makes it easier to form a precursor in which multiple alumina particles make contact with the surface of a titania particle.

Also, in the above-described second mode, to bring titania particles and alumina particles into contact with each other, the following may be employed, for example: a method in which a mixture containing titania particles and alumina particles is spray-dried; a method in which titania particles and alumina particles are granulated through a rolling motion; a method in which an aqueous dispersion of tinania particles is formed by dispersing tinania particles in a dispersion medium such as water, and then alumina particles are immersed in the aqueous dispersion of tinania particles; or a method in which a mixture of titania particles and alumina particles is slurried and is dried while being mixed. As for a method for granulating titania particles and alumina particles through a rolling motion, a precursor may also be prepared where alumina particles and water are placed in an oscillating granulator, put into a rolling motion, and then titania particles are added into the oscillating granulator and put into a rolling motion.

Conducting a preconditioning treatment step in the second mode makes it easier to form a precursor in which titania particles make contact with the surface of an alumina particle.

To bring titania particles and alumina particles into contact with each other in the third mode, the following may be employed, for example: a method in which a mixture containing titania particles and alumina particles is spray-dried; a method in which titania particles and alumina particles are granulated through a rolling motion; a method in which an aqueous dispersion of alumina particles is formed by dispersing alumina particles in a dispersion medium such as water and then titania particles are immersed in the aqueous dispersion of alumina particles; a method in which an aqueous dispersion of titania particles is formed by dispersing titania particles in a dispersion medium such as water and then alumina particles are immersed in the aqueous dispersion of titania particles; or a method in which a mixture of titania particles and alumina particles is slurried and is dried while being mixed.

In the third mode, titania particles with a particle diameter substantially the same as that of alumina particles are combined with alumina particles in a preconditioning treatment step. That makes it easier to form a mixture of a precursor where multiple alumina particles are in contact with the surface of a titania particle, a precursor where multiple titania particles are in contact with the surface of an alumina particle, and the like.

In the preconditioning treatment step, the obtained precursor will not be sintered directly after the preconditioning treatment step. Uniform particle diameters of a precursor are thought to be easier to form while the precursor and a binder ingredient are kneaded in a short period of time.

By doing such a preconditioning treatment step, titania particles and alumina particles are more likely to come in contact with each other. Accordingly, precursor 7 is formed, where alumina particles 9 make contact with titania particle 8 to cover its surface, for example (FIG. 5).

Figure 5:
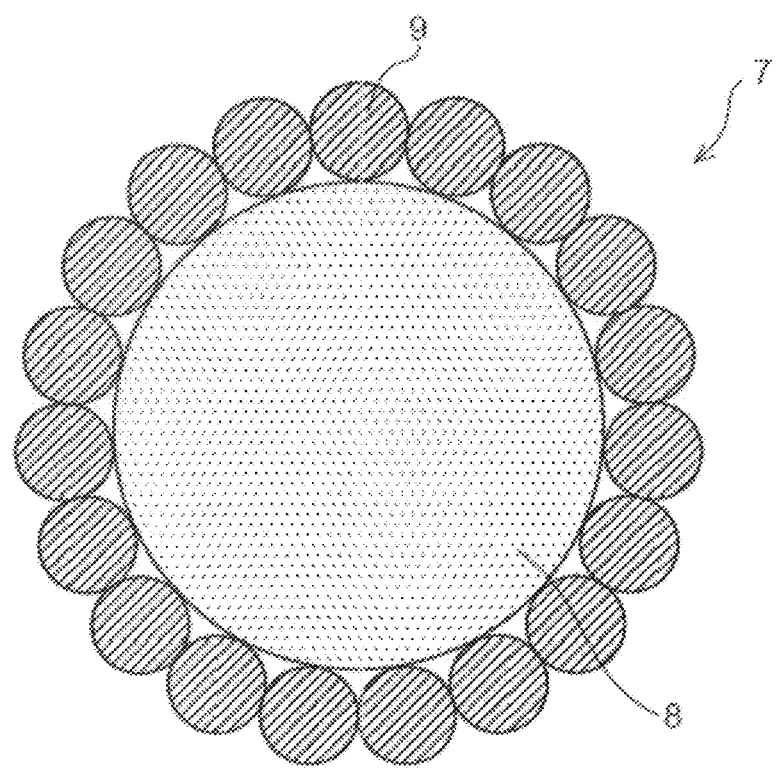
FIG. 5 is a view schematically showing an example of a precursor made of titania particles and alumina particles in an embodiment of the present invention.

FIG. 5 shows a state where titania particle 8 is covered with alumina particles 9. That is an example of a precursor. Here, the state of a precursor is not limited to such a size relationship between titania particles and alumina particles as shown in FIG. 5, and another state may be employed, where the size of alumina particles is greater than that of titania particles and the surface of an alumina particle is covered with titania particles. In addition, yet another state may be employed, where the size of titania particles is substantially the same as that of alumina particles.

Figure 6:
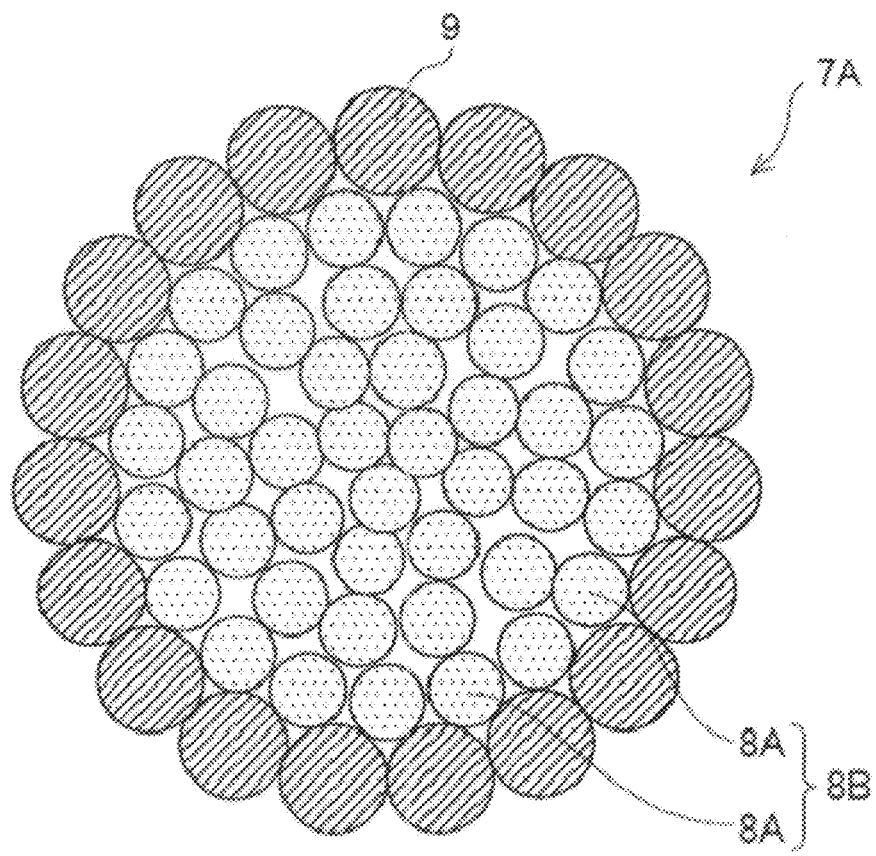
FIG. 6 is a view schematically showing another example of a precursor made of titania particles and alumina particles in an embodiment of the present invention.

Also, when an aggregate of primary particles is used for titania particles, titania particles and alumina particles are more likely to come in contact with each other by performing a preconditioning treatment step such as described above. For example, as shown in FIG. 6, a precursor (7A) is formed, where titania particles (secondary particles) (8B) that are titania particles (primary particles) (8A) are covered with alumina particles 9.

In the present application, a "precursor" means a granular substance where titania particles and alumina particles make contact and adhere to each other.

When titania particles, alumina particles and mullite particles make contact and adhere to each other, a precursor (a particle contact body of titania particles, alumina particles and mullite particles) is formed by the same methods described above for bringing titania particles and alumina particles into contact with each other.

To bring titania particles, alumina particles and mullite particles into contact with each other, the following may be employed, for example: a method in which a mixture containing titania particles, alumina particles and mullite particles is spray-dried; a method in which titania particles, alumina particles and mullite particles are granulated through a rolling motion; a method in which a mixed aqueous dispersion of alumina particles and mullite particles is formed by dispersing alumina particles and mullite particles in a dispersion medium such as water, and then titania particles are immersed in the mixed aqueous dispersion; or a method in which a mixture of titania particles, alumina particles and mullite particles is slurried and then dried while being mixed. As for a binder ingredient, the following are listed: celluloses such as methylcellulose, carboxymethyl cellulose and sodium carboxymethyl cellulose; alcohols such as polyvinyl alcohol; salts such as lignosulfonate; waxes such as paraffin wax and microcrystalline wax; and thermoplastic resins such as EVA, polyethylene, polystyrene, liquid-crystal polymer and engineering plastics.

The amount of a binder ingredient to be added is 0.1%~20% by mass based on 100% by mass of a precursor, for example. It may be 1%~15% by mass, for example.

To prepare raw material paste, other ingredients may be added to a precursor and a binder ingredient.

As for other ingredients, pore-forming agents, lubricants, plasticizers, dispersing agents, solvents and the like are listed.

For pore-forming agents, the following are listed: carbon materials such as graphite; resins such as polyethylene, polypropylene and polymethylmethacrylate; plant-based materials such as starch, nut shells, walnut shells and corn; ice; dry ice; and the like.

The amount of a pore-forming agent to be added is 0.1%~30% by mass based on 100% by mass of a precursor. It may be 1%~20% by mass, for example.

For lubricants and plasticizers, the following are listed, for example: alcohols such as glycerin; higher fatty acids such as caprylic acid, lauric acid, palmitic acid, alginic acid, oleic acid and stearic acid; and metal stearate such as aluminum stearate.

The amount of a lubricant or plasticizer to be added is 0.01%~5% by mass based on 100% by mass of a precursor. It may be 0.1%~1% by mass.

As for dispersing agents, the following, for example, are listed: inorganic acids such as nitric acid, hydrochloric acid and sulfuric acid; organic acids such as oxalic acid, citric acid, acetic acid, malic acid and lactic acid; alcohols such as methanol, ethanol and propanol; surfactants such as ammonium polycarboxylate and polyoxyalkylene alkyl ether; and so forth.

The amount of a dispersing agent to be added is 0.01%~10% by mass based on 100% by mass of a precursor. It may be 0.05%~2% by mass.

As for solvents, the following are listed, for example: alcohols such as methanol, ethanol, butanol and propanol; glycols such as propylene glycol, polypropylene glycol and ethylene glycol; water; and the like.

The amount of a solvent to be used is 0.1%~50% by mass. It may be 10%~40% by mass.

Forming of Honeycomb Structural Body (S2)

In a forming step, a body is formed by shaping the raw material paste into a honeycomb structure.

Forming the raw material paste into a shape is not limited specifically, and extrusion methods using a honeycomb die or the like may be employed.

Wrapping of Non-Gas-Permeating Film (S3)

A wrapping step is conducted by wrapping the surface of a body shaped from the raw material paste using non-gas-permeating film, and then proceeding to a drying step. Conducting such a wrapping step prevents moisture loss from the surface of a body, which is thought to occur after a forming step is completed and before a drying step begins. Thus, it is thought that cracking and deformation thought to be caused by different levels of drying progress during a drying step are less likely to occur.

A method for wrapping a body is not limited specifically. It is not limited to any specific method as long as moisture loss is prevented from the surface of the body. The entire surface of the body except for the portion in contact with a transportation roller, or the entire surface of the body, may be wrapped.

As for non-gas-permeable film, it is not limited specifically as long as moisture loss is prevented from the surface of a body. For example, films made of polyethylene, polyvinyl chloride, polyvinylidene chloride, polypropylene or the like, in particular, Saran Wrap (registered trademark), Saran Premium Wrap (registered trademark) or the like, may be used.

Such non-gas-permeable film is removed from the body before a drying step starts.

Drying of Body Shaped from Raw Material Paste (S4)

In a drying step, a body is dried by maintaining the temperature difference to be 20° C. or lower between the surface temperature at the outer surface of the body shaped from the raw material paste and the temperature at the central portion of the body. Accordingly, different levels of drying progress during a drying step are thought to be prevented. As a result, cracking and deformation of a body and a ceramic body are thought to be prevented.

As for a method for maintaining the temperature difference to be 20° C. or lower between the surface temperature on the outer surface of the body shaped from the raw material paste and the temperature at the central portion of the body, it is not limited specifically.

For example, to dry a body while maintaining the difference of 20° C. or lower between the surface temperature at the outer surface of the body and the temperature at the central portion of the body, the surface temperature at the outer surface of the body and the temperature at the central portion of the body are monitored and output of a drying apparatus (i.e., output of heat applied to the body) is controlled accordingly. To measure temperature, a thermocouple may be used. A radiation thermometer calibrated by thermocouple may be used for a continuous processing dryer. Once output condition of a dryer is determined for maintaining the difference of 20° C. or lower between the surface temperature at the outer surface of the body and the temperature at the central portion of the body, output of a drying apparatus (i.e., output of heat applied to the body) may be controlled based on the output condition and monitoring may be performed randomly or in cycle rather than each time.

Figure 7:
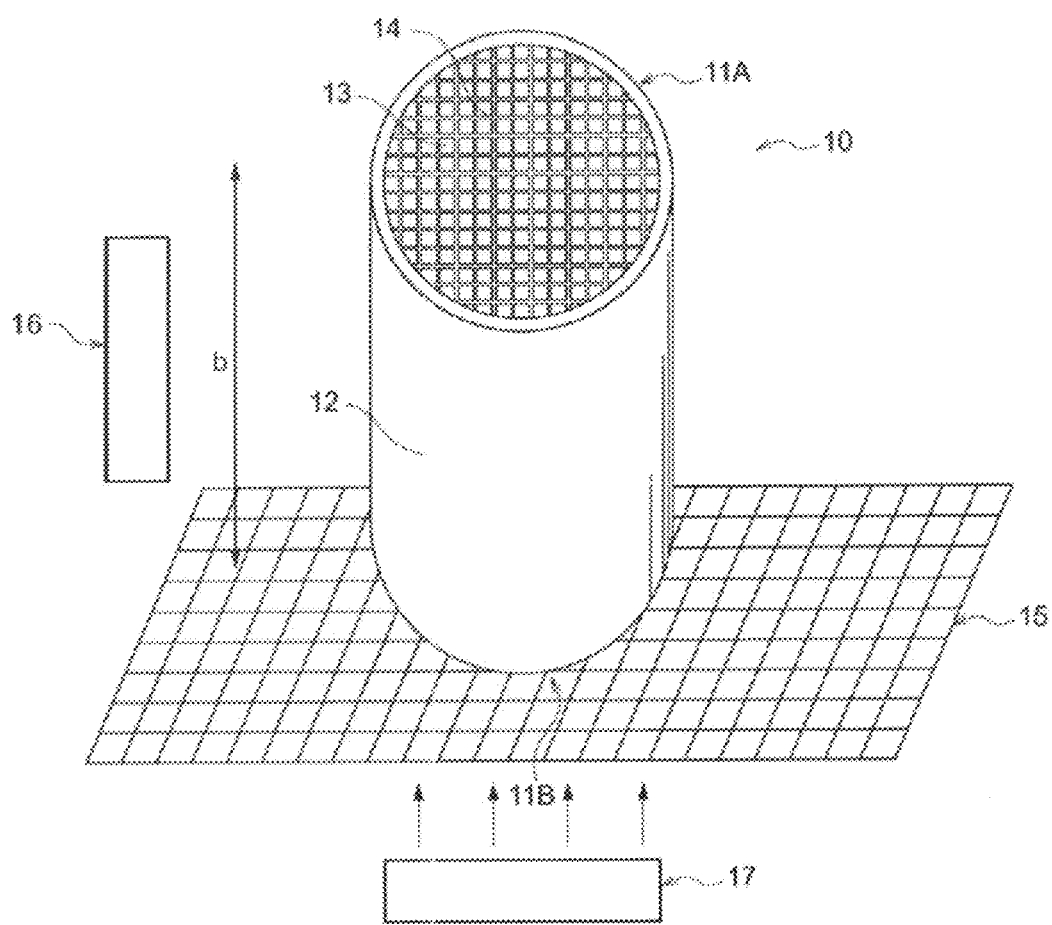
FIG. 7 is a view schematically illustrating a drying method according to an embodiment of the present invention.

As for a dryer to be used for drying, it is not limited to any specific type as long as the temperature difference is maintained to be 20° C. or lower between the surface temperature at the outer surface of the body shaped from the raw material paste and the temperature at the central portion of the body. For example, microwave dryers, hot-air dryers, dielectric heating dryers, reduced-pressure dryers, vacuum dryers, freeze dryers and the like, or any combination thereof may be used. When microwaves are irradiated at the outer surface of a body using only a microwave dryer, phenomena occur such as the rate of temperature rise at the central portion of the body being higher than the rate of temperature rise at the outer surface of the body. On the other hand, if a body is dried in a drying chamber equipped with microwave dryer 16 and hot-air dryer 17 as shown in FIG. 7, for example, the temperature difference is maintained to be 20° C. or lower between the surface temperature at the outer surface of the body shaped from the raw material paste and the temperature at the central portion of the body. Specifically, body 10 shaped from the raw material paste is set in a way that end portion (11B) of body 10 in longitudinal direction (b) makes contact with stainless-steel wire screen 15, and microwaves are irradiated using microwave dryer 16 at the outer-surface 3 side of body 10, while hot air is blown using hot-air dryer 17 from end portion (11B) toward another end portion (11A). Accordingly, the temperature difference is maintained to be 20° C. or lower between the surface temperature at the outer surface of the body shaped from the raw material paste and the temperature at the central portion of the body. Multiple microwave dryers 16 and hot-air dryers 17 may be set in a drying chamber.

Here, microwave radiation from a microwave dryer is preferred to have a frequency range of 300 MHz~30 GHz, more preferably 900 MHz~5 GHz, and even more preferably 1 GHz~3 GHz. The microwave output power is preferred to be 1 kW~75 kW, more preferably 2 kW~50 kW.

Figure 8:
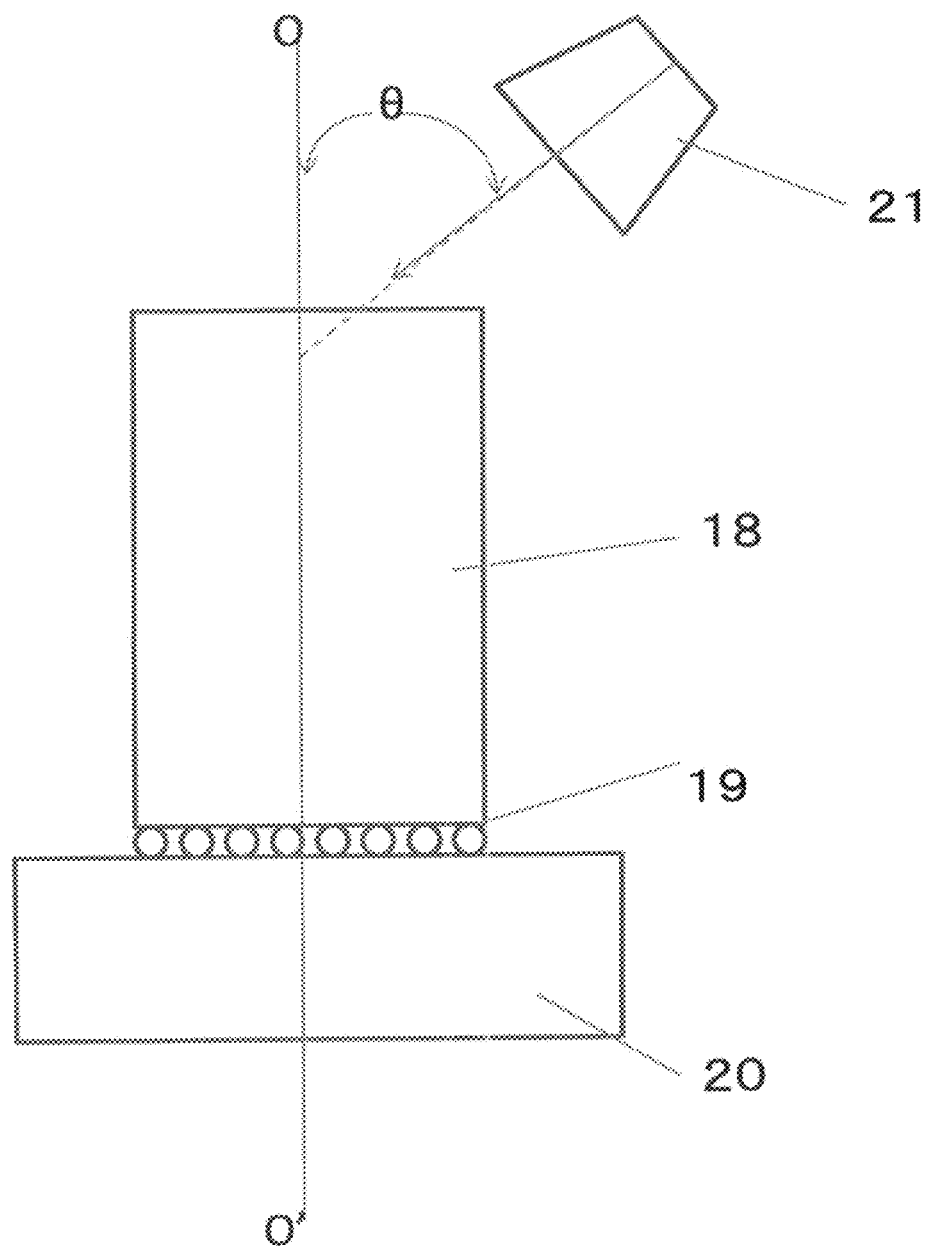
FIG. 8 is a view schematically illustrating another drying method according to an embodiment of the present invention.

Also, microwaves may be irradiated at an end surface of a body with a predetermined angle θ to the central axis of body 18 as shown in FIG. 8. In particular, body 18 is positioned to stand vertically with an end surface of body 18 on support base 20, and microwave generator 21 is positioned above it. Microwave generator 21 is set for its microwave radiation face to be positioned opposite an end surface of body 18 with an inclination angle to a normal line to the end surface of body 18. Microwave generator 21 is positioned to radiate microwaves with predetermined angle θ to the central axis of body 18 (in particular, microwaves radiated from the center of the microwave radiation face of microwave generator 21, for example). Accordingly, microwaves are radiated from microwave generator 21 at an end surface of a body with predetermined angle θ to the central axis of the body.

The central axis of body 18 means a virtual line that passes through the center of both end surfaces of body 18 and is along a longitudinal direction of body 18 (line (O-O') in FIG. 8).

Predetermined angle θ is an acute angle to the central axis; in particular, it is preferred to be in a range of 10~60 degrees.

Compared with when microwaves are irradiated at an end surface of body 18 in a direction parallel to the central axis of body 18 (microwaves are irradiated in a direction perpendicular to the end surface of body 18), it is thought that microwaves tend to be absorbed in partitions when microwaves are irradiated at an end surface of body 18 with a predetermined angle to the central axis of body 18. Accordingly, it is thought that the duration for drying a body is shortened while the energy consumption needed for drying is reduced.

It is an option to set multiple microwave generators 21.

In addition, microwaves may be irradiated at body 18 while microwave generator 21 rotates around body 18. Alternatively, body 18 may rotate by setting its central axis to be a rotation axis.

Also, one or more hot-air dryers in addition to microwave generator 21 may be equipped in a drying chamber.

In addition, when a drying step is conducted while body 18 is positioned vertically with its end surface on support base 20, it is an option to dry body 18 while body 18 is positioned upright with granules 19 placed between body 18 and support base 20 so that the end surface of body 18 does not make direct contact with support base 20. Since the end surface of body 18 adjacent to support base 20 faces support base 20 with granules 19 in between, the end surface does not receive resistance from support base 20 while drying and contracting. Thus, it is thought that drying contraction occurs without being hindered. Accordingly, the end surface of body 18 facing support base 20 is thought to be dried at the same contraction rate as that of its opposing end surface.

The material or the like of support base 20 is not limited specifically as long as body 18 is set on a main surface of support base 20 (the surface for setting a body). For example, it may be made of metal or ceramic. However, a material that can avoid induction heating is preferred if a microwave dryer is used. A support base is preferred to be in the shape of a screen or to have numerous pores.

Granules 19 are selected from those that are heat tolerant so that they will remain without being burned by the heat during a drying step. The material of granules 19 is preferred to be ceramics such as oxide ceramics, carbide ceramics, nitride ceramics and the like. For example, zirconia, silicon carbide, aluminum nitride or the like is used.

The mean volume particle diameter of granules 19 is preferred to be greater than the diameter (maximum diameter) at the surface openings of the partitions of a body shaped from the raw material paste. In so setting, granules are prevented from entering the cells of the body.

The hot air blown from a hot-air dryer is preferred to have an air speed of 0.1 m/s~100 m/s or 30 m/s~60 m/s. In addition, the temperature is preferred to be 50° C.~250°.

Here, the central portion of a body means the center of a diameter of the body.

The temperature difference is preferred to be 18° C. or lower between the surface temperature at an outer surface of a body shaped from the raw material paste and the temperature at the central portion of the body. More preferably, it is preferred to be 15° C. or lower, and even more preferably 10° C. or lower.

The duration and temperature for drying is appropriately set depending on the volume or the like of a honeycomb structure.

Also, the relative humidity in a dryer is preferred to be controlled during a drying step so that the amount of moisture in a cylinder-like frame portion that forms the outer surface of a body (hereinafter referred to as "outer-surface moisture content") is maintained at substantially the same level as the amount of moisture in partitions of through-holes at the central portion of the body (hereinafter referred to as "central-portion moisture content").

In so setting, partial dryness of the body is prevented. As a result, cracking and deformation of a ceramic body caused by different levels of drying progress are thought to occur less frequently.

Specifically, drying is preferred to be conducted by controlling the relative humidity in a dryer so that the outer-surface moisture content of a body and the central-portion moisture content of the body are zero to approximately 15%, more preferably zero to approximately 10%, even more preferably zero to approximately 5%. Also, drying is preferred to be conducted so that the moisture contents are uniform from the outer surface to the central portion.

A method is not limited specifically for controlling the relative humidity in a dryer (drying chamber) to maintain the outer-surface moisture content of a body substantially the same as the central-portion moisture content of the body. For example, a method such as follows may be conducted: the relative humidity in a drying chamber is maintained at a certain level and hot air is blown into the drying chamber while hot air is blown from an end of a body in a longitudinal direction toward the other end so that the air in the drying chamber is circulated. In addition, it is also preferred to decrease the relative humidity so that the moisture content of the entire body at the time drying is completed is substantially the same as the relative humidity at the time drying is completed. In such a case, the relative humidity at the time drying is completed is preferred to be the same as or higher than the moisture content of the entire body at the time drying is completed. For example, when the moisture content of the entire body at the time drying starts is approximately 20% and the moisture content of the entire body at the time drying is completed is set at approximately 5% (target value), the relative humidity at the time drying starts is set at approximately 15% while the relative humidity is gradually lowered until it reaches approximately 10% so that the body is dried as desired. Here, the relative humidity at the time drying starts or is completed is not affected by the moisture content of the entire body at the time drying starts.

As long as the relative humidity in a dryer is set higher than the target value of the moisture content of the entire body at the time drying is completed, it is not limited specifically.

Sealing of Through-Holes (S5)

In a sealing step, either end of a through-hole of a dried body in a longitudinal direction is sealed using a sealant.

Application of a sealant to a honeycomb body is not limited specifically. There are methods such as immersing an end surface of a body into sealant slurry, injecting a sealant into a through-hole from an end surface using an injector, and the like.

As for a sealant, it is not limited to any specific type. For example, the raw material paste made of titania particles and alumina particles, or made of other ceramic, may be used.

Sealant slurry is prepared by adding a binder ingredient, water or the like to titania particles and alumina particles, for example. The viscosity of sealant slurry is adjusted properly according to the type and the like of the sealant.

Degreasing of Honeycomb Structural Body (S6)

In a degreasing step, organic ingredients are removed from the sealed body.

Conditions for removing organic ingredients from the sealed honeycomb body are not limited specifically, and may be selected properly according to the type and amount of organic ingredients contained in the honeycomb body. For example, degreasing is conducted at 150° C.~800° C. for two hours, etc.

Sintering of Honeycomb Structural Body (S7)

In a sintering step, a ceramic honeycomb structure is obtained by sintering a body from which organic ingredients have been removed.

Sintering is not limited to any specific method, and is conducted using a sintering furnace such as an electric tube furnace, electric box furnace, tunnel kiln, far infrared furnace, microwave heater, shaft kiln, reverberatory furnace, rotary-hearth furnace or roller-hearth furnace.

As for sintering methods, bodies may be sintered batch by batch or continuously. Alternatively, a body may be settled or circulated while being sintered.

The sintering temperature is 1350° C. or higher, for example, and it may be set at 1400° C. or higher. In addition, the sintering temperature is 1650° C. or lower, for example, and may be set at 1550° C. or lower.

The programming rate of the sintering temperature is not limited specifically, and may be set at 1° C./hour~500° C./hour, for example.

Sintering a honeycomb body is conducted under oxygen atmosphere such as atmospheric air, for example.

The duration for sintering a honeycomb body differs depending on the amount of the raw material paste, the type of sintering furnace, the sintering temperature, the sintering atmosphere and the like. It may be set for 10 minutes~24 hours, for example.

Ceramic Honeycomb Structural Body

A ceramic honeycomb structure according to an embodiment of the present invention is obtained by a manufacturing method that includes the following: a preparation step for preparing raw material paste by kneading titania particles, alumina particles and a binder ingredient; a forming step to form a body having through-holes and partitions by shaping the raw material paste into a honeycomb structure; a drying step for drying the body by maintaining the temperature difference to be 20° C. or lower between the surface temperature at the outer surface of the body shaped from the raw material paste and the temperature at the central portion of the body; and a sintering step to obtain a ceramic honeycomb structural body by sintering the body.

When an element analysis is performed on the obtained ceramic body using a scanning electron microscope (S-4800, Hitachi, Ltd.) and an energy dispersive X-ray spectrometer (EMAX Energy EX-250, Horiba, Ltd.), the ratio (weight ratio) of titania and alumina in a ceramic body is preferred to be in a range of 7:10~4:10, more preferably 6:10~5:10.

In addition, it is preferred that titania be contained at 15 wt. %~50 wt. % and alumina at 45 wt. %~70 wt. % of the entire weight of the obtained ceramic body; more preferably, titania at 22 wt. %~40 wt. % and alumina at 55 wt. %~65 wt. %. Furthermore, it is preferred for silica to be contained at 1 wt. %~20 wt. % or 3 wt. %~15 wt. % of the entire weight of the obtained ceramic body.

Partitions of a ceramic honeycomb structural body can function as a filter to capture particulate matter (PM).

Therefore, a ceramic honeycomb structure can function, for example, as a diesel particulate filter (DPF) or the like.

EXAMPLES

The present invention is further described in detail by the following examples. However, the present invention is not limited to such examples.

Example 1

Eight parts by weight of titania particles with a mean volume particle diameter of 12 μm (brand name TiO$_2$ 3020 (registered trademark), Kronos Incorporated), 10 parts by weight of alumina particles with a mean volume particle diameter of 3 μm (brand name Al$_2$O$_3$ RMA (registered trademark), Alcan Inc.), and 40 parts by weight of water are put in a spray dryer (G8210-A, Yamato Scientific Co., Ltd.), and spray dried to form a precursor.

The precursor, 6 parts by weight of alumina particles, 3 parts by weight of silicon dioxide, 20 parts by weight of pore-forming graphite (brand name A625, Asbury Graphite Mills, Inc.) and 4.5 parts by weight of methyl cellulose (brand name METOLOSE 60SH, Shin-Etsu Chemical Co., Ltd.) are put in a kneader (brand name Mix Muller, Shinto Kogyo K.K.), and kneaded to prepare raw material paste.

The raw material paste is extruded through a honeycomb die to form a honeycomb structural body having approximately 300 cpsi (approximately 46.5 cell/cm$^2$) with a partition thickness of approximately 0.010 inch (approximately 0.25 mm). The raw material paste is shaped into a body with a diameter of 143.8 mm and a length of 150 mm. After a body is cut to a desired size, it is wrapped with Saran Wrap (registered trademark).

Then, the Saran Wrap is removed from the body, and an end of the body in a longitudinal direction is set on a surface of a stainless-steel wire screen. Microwaves with a frequency of 2.45 GHz and output power of 8 kW are irradiated from a microwave dryer at the outer surface of the body, while hot air with an air speed of 50 m/s and a temperature of 80° C. is blown from the end in contact with the wire screen toward the other end of the body using a hot-air dryer set under the wire screen, and the body is dried for 10 minutes. At that time, the surface temperature at the outer surface of the body is 65° C. and its central temperature is approximately 60° C. Also, the moisture content at the outer surface and the central portion of the body is approximately 5%.

Next, sealant slurry is prepared from the same raw material paste as used for the honeycomb body.

Masking films are put on both end surfaces of the dried body. Then, the masking films are bored into a checkered pattern so that the ceramic honeycomb structural body obtained after sintering is sealed in checkered patterns which are complementary on one end surface and on the other end surface of the ceramic body. Accordingly, a masked body is formed. As for masking film, tape with an adhesive layer (adhesive force of 5.3 N/cm) made by forming acrylic adhesive on a polyester base is used.

The portion of a dried body from an end sealed with masking film to a point 5 mm upward in a longitudinal direction is immersed into sealant slurry. Then, the body is lifted from the sealant slurry. In the same manner, the other end of the body in a longitudinal direction is also immersed into the sealant slurry and lifted from the sealant slurry. Accordingly, a sealed body is obtained.

Under atmospheric air, the sealed body is heated from room temperature to 200° C. at a programmed rate of 40° C./hour; when the temperature has reached 200° C., it is heated to 300° C. at a programmed rate of 10° C./hour; when the temperature has reached 300° C., it is heated to 450° C. at a programmed rate of 40° C./hour; the temperature is kept at 450° C. for 5 hours to degrease the body; and it is heated at a programmed rate of 500° C./hour to 1450° C., where it is kept for 5 hours to sinter the body. Accordingly, a ceramic honeycomb structural body is obtained.

An element analysis is performed on the obtained ceramic body using a scanning electron microscope (S-4800, Hitachi, Ltd.) and an energy dispersive X-ray spectrometer (EMAX Energy EX-250, Horiba, Ltd.). As a result, the ratio (weight ratio) of titania and alumina in the ceramic body is found in a range of 6:10~5:10.

Comparative Example 1

The same as in Example 1, raw material paste is prepared, and a body shaped from the raw material paste is cut to a desired length.

Then, using a microwave dryer, microwaves with a frequency of 2.45 GHz and output power of 8 kW are irradiated at the outer surface of the body cut to a desired length so that the body is dried for 10 minutes.

At that time, the surface temperature at the outer surface of the body is approximately 50° C. and its central temperature is approximately 90° C. Also, the moisture content at the outer surface is approximately 10%, and the moisture content at the central portion is approximately 15%.

Then, the same as in Example 1, the body is sealed, degreased and sintered to obtain a ceramic honeycomb structural body.

Evaluation

Ceramic bodies obtained in Example 1 and Comparative Example 1 are observed visually and by using a scanning electron microscope (EMAX Energy EX-250, Horiba, Ltd.) to check how often cracking and deformation have occurred.

As a result, it is found that a ceramic body obtained in Example 1 is less likely to have cracking than a ceramic body obtained in Comparative Example 1. It is also found that a ceramic body obtained in Example 1 is less likely to be deformed than a ceramic body obtained in Comparative Example 1.

Obviously, numerous modifications and variations of the present invention are possible in light of the above teachings. It is therefore to be understood that within the scope of the appended claims, the invention may be practiced otherwise than as specifically described herein.

What is claimed is:

1. A method for manufacturing a ceramic honeycomb structure, comprising:
    kneading titania particles, alumina particles and a binder ingredient such that a raw material paste comprising the titania particles, the alumina particles and the binder ingredient is prepared;
    forming a body comprising the raw material paste and having a honeycomb structure such that the body has the honeycomb structure having a plurality of through-holes extending in a longitudinal direction of the body and a plurality of partition portions formed between the through-holes;
    drying the body comprising the raw material paste and having the honeycomb structure at a drying temperature in a range of 50° C. to 250° C. such that the body maintains a temperature difference of from 5° C. to 20° C. between a surface temperature at an outer surface of the body and a temperature at a central portion of the body and a dried body having the honeycomb structure is formed prior to sintering; and
    sintering the dried body having the honeycomb structure at a sintering temperature in a range of 1350° C. to 1650° C. such that a ceramic body comprising aluminum titanate and having the honeycomb structure is formed,
    wherein the drying of the body includes determining an output condition of heat to be applied to the body and controlling an output of heat being applied to the body based on the output condition.

2. The method for manufacturing a ceramic honeycomb structure according to claim 1, wherein the drying of the body comprises irradiating microwaves onto the outer surface of the body and blowing hot air from one end of the body toward the other end of the body in the longitudinal direction such that the hot air dries the body at the drying temperature in the range of 50° C. to 250° C.

3. The method for manufacturing a ceramic honeycomb structure according to claim 1, further comprising:
wrapping a non-gas-permeable film around a surface of the body such that the non-gas-permeable film prevents moisture loss from the surface of the body comprising the raw material paste; and
removing the non-gas-permeable film from the surface of the body before the drying.

4. The method for manufacturing a ceramic honeycomb structure according to claim 1, further comprising applying a sealant to one end of each of the through-holes of the body in the longitudinal direction such that each of the through-holes of the body is sealed at the one end.

5. The method for manufacturing a ceramic honeycomb structure according to claim 1, further comprising degreasing the body comprising the raw material paste and having the honeycomb structure such that an organic ingredient in the raw material paste of the body is removed.

6. The method for manufacturing a ceramic honeycomb structure according to claim 1, further comprising forming a precursor comprising particles comprising titania particles and alumina particles, wherein the kneading comprises kneading the binder ingredient and the particles of the precursor comprising the titania particles and the alumina particles.

7. The method for manufacturing a ceramic honeycomb structure according to claim 6, wherein the forming of the precursor comprises spray-drying the alumina particles onto the titania particles.

8. The method for manufacturing a ceramic honeycomb structure according to claim 1, wherein the drying of the body comprises irradiating microwaves upon an end surface of the body and inside the through-holes of the body in the longitudinal direction such that the end surface and through-holes of the body receive the microwaves at an angle θ with respect to a central axis of the body extending in the longitudinal direction.

9. The method for manufacturing a ceramic honeycomb structure according to claim 8, wherein the angle θ is set in a range of 10~60 degrees.

10. The method for manufacturing a ceramic honeycomb structure according to claim 1, wherein the drying of the body includes positioning on a base the body comprising the raw material paste and having the honeycomb structure such that an end surface of the body in the longitudinal direction faces a surface of the base.

11. The method for manufacturing a ceramic honeycomb structure according to claim 1, wherein the drying of the body includes positioning on a base having granules the body comprising the raw material paste and having the honeycomb structure such that the granules are interposed between the body and the base.

* * * * *